United States Patent

[11] 3,624,405

| [72] | Inventors | John Daniel Bishop<br>Basking Ridge, Somerset County;<br>Frank Fuller Judd, Madison, Somerset County; Robert Edward Schroeder, Parsippany, Somerset County; Peter Pentti Untamo, Branchburgh Township, Somerset County, all of N.J. |
|---|---|---|
| [21] | Appl. No. | 53,812 |
| [22] | Filed | July 10, 1970 |
| [45] | Patented | Nov. 30, 1971 |
| [73] | Assignee | Bell Telephone Laboratories, Incorporated<br>Murray Hill, N.J. |

[54] BALANCED CURRENT REGULATOR WITH CURRENT-BALANCE-RESPONSIVE FEEDBACK CONTROL CIRCUIT
6 Claims, 4 Drawing Figs.

[52] U.S. Cl. ................................................... 307/33,
321/2, 321/25, 323/6, 323/40, 323/57, 323/83
[51] Int. Cl. ........................................................ H02m 3/22,
G05f 1/38
[50] Field of Search........................................... 307/12, 17,
30, 31, 33, 38; 321/2, 25; 323/1, 6, 20, 40, 56, 57,
83, 75 S, 62, 60, 89 B, 89 P

[56] References Cited
UNITED STATES PATENTS

| 2,968,738 | 1/1961 | Pintell | 321/2 X |
|---|---|---|---|
| 3,045,174 | 7/1962 | Lafuze | 321/25 UX |
| 3,124,697 | 3/1964 | Trenchard | 323/22 T |
| 3,246,170 | 4/1966 | Olshan | 323/1 UX |
| 3,384,803 | 5/1968 | Hardin et al. | 321/2 |
| 3,037,159 | 5/1962 | Brown | 321/25 X |
| 3,320,510 | 5/1967 | Locklair, Jr. | 321/2 |
| 3,470,496 | 9/1969 | Dembling | 321/2 X |

*Primary Examiner*—A. D. Pellinen
*Attorneys*—R. J. Guenther and E. W. Adams, Jr.

ABSTRACT: A current regulator to supply two balanced regulated currents of opposite polarity utilizes separate sum and difference current-sensing transformers to generate feedback control signals. These feedback signals control the operation level of a saturable reactor which regulates the drive signal to the output power transformer. Protection circuits responsive to the output voltage prevent it from exceeding predetermined critical levels.

INVENTORS
J. D. BISHOP
F. F. JUDD
R. E. SCHROEDER
P. P. UNTAMO

BY Alfred T. Steinmetz
ATTORNEY

BALANCED CURRENT REGULATOR WITH CURRENT-BALANCE-RESPONSIVE FEEDBACK CONTROL CIRCUIT

FIELD OF THE INVENTION

This invention is concerned with constant current power supplies designed to supply two regulated output currents of opposite polarity and equal amplitude. The invention is particularly concerned with measuring the combined sum of and difference between the magnitudes of the two output currents and utilizing these measurements to regulate the two output currents.

BACKGROUND OF THE INVENTION

In order to accurately regulate the output current of a constant current power supply, the current must be accurately measured in terms of a voltage it generates and compared to a known reference voltage. The accurate measurement of a regulated output current is difficult because it involves converting the current to a voltage measurement. This difficulty is compounded when a plurality of currents must be measured and their respective magnitudes balanced. Current sensing techniques usually require the output current to pass through an impedance to generate a voltage drop. This generated voltage drop is compared with a reference voltage. The variations in the voltage drop across this impedance as compared with the reference voltage, are used to control or regulate the output current of the power supply. One method of sensing the difference in the output current magnitudes of a power supply for regulation control purposes is to insert series resistors in each one of the output leads. The voltage drop occuring across each of the resistors is measured and compared with a fixed reference voltage and with each other in a comparator circuit so that the relative magnitude of each of the currents in the output leads may be determined. This arrangement is generally unsatisfactory for most power applications since the resistance absorbs a significant portion of the output power. This arrangement is also cumbersome in requiring separate measuring circuitry to determine the individual current magnitudes and the difference between these magnitudes. Another disadvantage of this type of arrangement is that it does not isolate the output of the power supply from the current regulation control circuit. Isolation of the power supply output from the regulation control circuit is desirable to reduce the output noise and to protect the regulation control circuitry from high-voltage surges which may occur at the output terminals due to lighting surges.

One feedback control arrangement to regulate the output current of a power supply secures the desirable isolation by utilizing a magnetic amplifier to sense the output current magnitude. A power supply utilizing magnetic amplifiers to regulate output currents is disclosed by J. D. Bishop and S. Mottel in an article entitled "Power Supplies" in the Apr., 1969 issue of the Bell System Technical Journal, volume 48, No. 4. This arrangement is not suitable for application in the power supply of the invention since it has no provision to measure the unbalance in a plurality of output currents.

It is therefore an object of the invention to efficiently sense the magnitudes and relative unbalance of a plurality of output currents of a constant current power supply with minimum power consumption.

It is another object of the invention to isolate the current magnitude and balance sensing arrangement from the feedback regulation arrangement.

SUMMARY OF THE INVENTION

Therefore, in accord with the above objects, a constant current regulator to supply balanced currents of equal magnitude and opposite polarities includes a feedback regulator arrangement responsive to the sum and difference of the two output currents. This feedback arrangement is compact and provides transformer isolation between each output and all other portions of the power supply circuitry.

The balanced output currents supplied by the power supply are regulated by means of a saturable reactor which is responsive to feedback signals generated by a current-balance- and magnitude-sensing arrangement. The current-balance- and magnitude-sensing arrangement comprises additional transformer control windings on separate cores which are wound with polarities to generate control signals responsive to both the sum and the difference of the output currents. These sum and difference control signals are applied, via a gating circuit and feedback amplifier, to the saturable reactor to control its operating level.

The difference detector windings are connected in series with the output bridge rectifier diodes of the power supply. This novel feature advantageously permits sensing of an output current balance on an alternating-current basis. This particular sensing arrangement prevents saturation of the winding core even though individual windings carry a current having a DC component.

In its overall operation the constant current power supply generates an AC signal from a DC source of power by means of a half-bridge inverter circuit which comprises two capacitors and two transistors arranged in a bridge configuration. The half-bridge inverter includes a single surge type starting circuit which initiates switching action therein upon the application of DC power to the bridge. The output circuit is DC isolated from the half-bridge inverter by means of the power output transformer.

The balanced output currents of the output transformer are transmitted to a spike suppression filter. The filter utilizes a mutually coupled inductor with windings in both output leads poled to attenuate longitudinal output noise. The power supply circuit additionally includes a current droop circuit which limits the maximum output voltage if the connected load resistance becomes excessively high. The current droop circuit acting through the feedback regulator reduces the saturable reactor control current as required to prevent the output voltage for exceeding a predetermined level.

A feature of the invention is an auxiliary regulated voltage which is derived from the half-bridge inverter circuit. The circuit is to derive the auxiliary voltage includes a protection circuit in the form of a nonlinear shunt voltage limiter to prevent overvoltage damage to the output load circuit by limiting the output voltage to a predetermined threshold voltage. The operation of the shunt limiter circuit is controlled by a varistor whose characteristics prevent the shunt limiter from operating until a high output voltage level is reached. This high output voltage level occurs just below the threshold voltage at which protection is desired. Hence at normal operating voltages, the shunt limiter does not consume any of the output power.

DESCRIPTION OF THE DRAWINGS

Many additional objects and features of the invention will become apparent from the following description when taken in connection with the drawings in which.

FIG. illustrates a power supply in block diagram form embodying principles in accord with the present invention.

DETAILED DESCRIPTION

Figure 1:
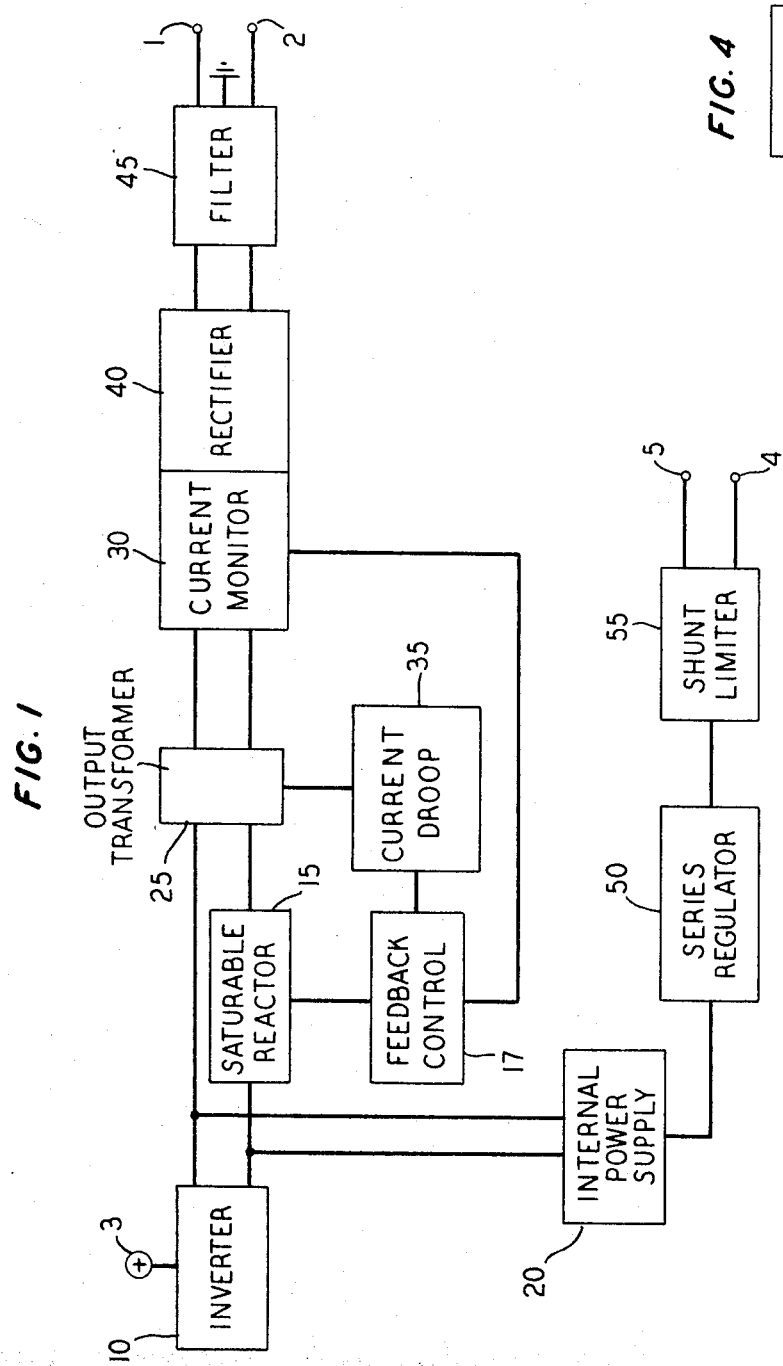

The constant current power supply disclosed in block diagram in FIG. 1 supplies two regulated DC currents of equal magnitude and opposite polarity at the output terminals 1 and 2. A DC source of potential 3 is coupled to an inverter circuit 10. The inverter circuit 10 converts the DC voltage at source 3 into an AC voltage. The inverter circuit output is applied to the series connection of a gate winding of the saturable reactor 15 and a primary winding of the output transformer 25. The output of the secondary winding of the transformer 25 is coupled to a current monitor circuit 30 which develops control signals responsive to the sum and the difference of the two output currents. The control signals developed by the current monitor 30 are applied to the feedback control 17. The feedback control 17 utilizes these signals to develop the control winding current for the saturable reactor 15 which in turn controls the magnitude of current applied by the inverter 10 to the primary of transformer 25.

A current droop circuit 35 monitors the output voltage at the secondary of the transformer 25. The current droop circuit 35 responds when this voltage increases above a preset level which is indicative of a voltage increase at the output terminals 1 and 2. The current droop circuit 35 applies a control signal to the feedback control 17 which in turn responds to control the saturable reactor 15 to limit the output voltage and prevents hazardous voltages from existing at output terminals 1 and 2.

The AC output signal of the transformer 25 is rectified to a DC signal by a rectifier 40 which is an integral part of the current monitor 30. This rectified signal is applied to a filter 45 which in turn is coupled to the output terminals 1 and 2.

An internal power supply 20 is directly coupled to the output of inverter 10 and derives DC voltage from the AC output voltage of the inverter 10. A series regulator 50 is coupled to the output of power supply 20. The regulated voltage developed by the series regulator 50 is coupled to output terminals 4 and 5 via a shunt limiter 55. The shunt limiter 55 provides overvoltage protection to circuits connected to terminals 4 and 5 by diverting sufficient output current from the load circuit connected to terminals 4 and 5 to limit the voltage applied to the load circuit.

Figure 4:
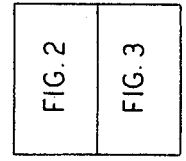
FIG. 4 is a diagram showing how to connect FIGS. 2 and 3.
Figure 2:
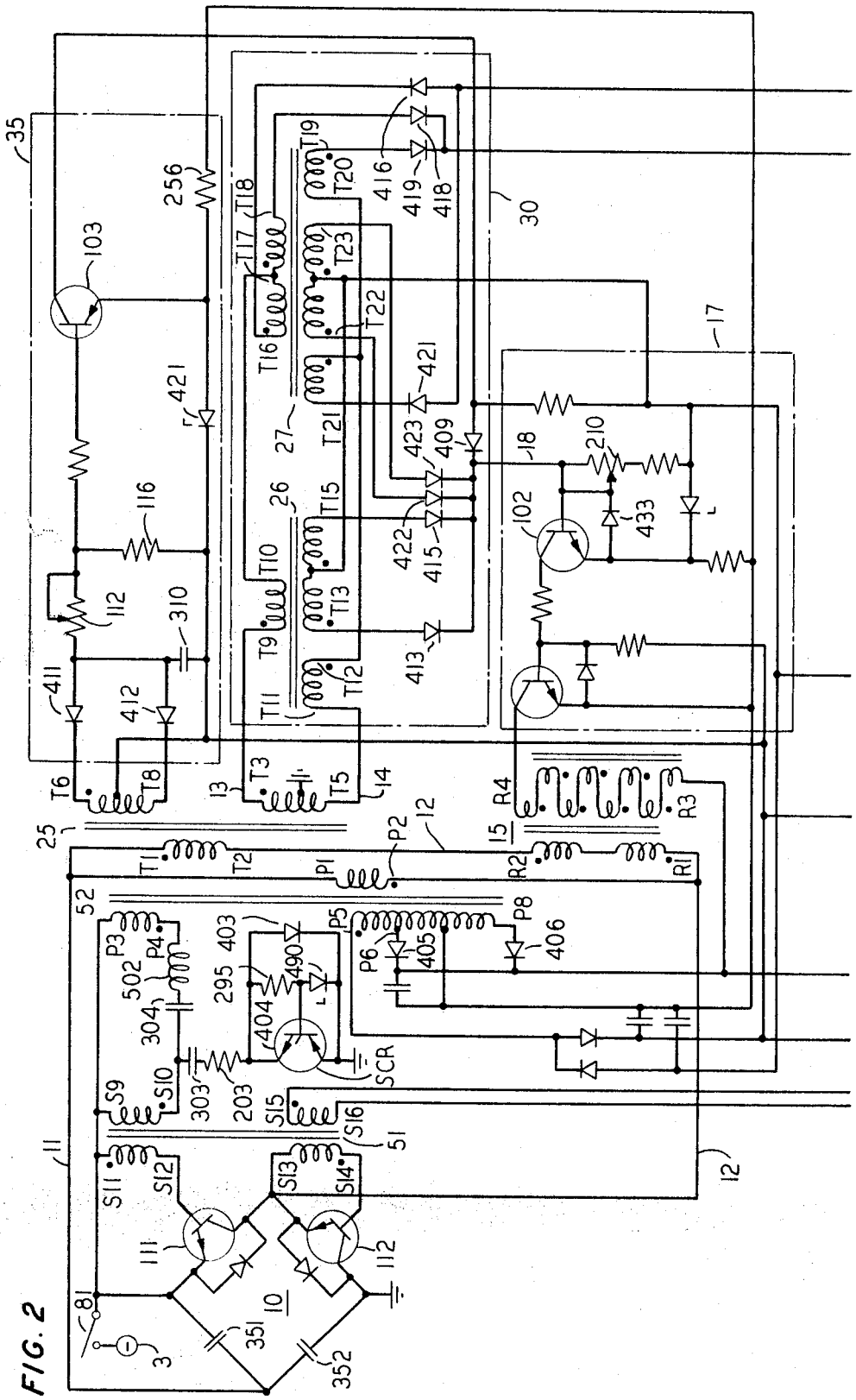
FIGS. 2 and 3 are a schematic of a constant current power supply embodying the principles of the present invention.
Figure 3:
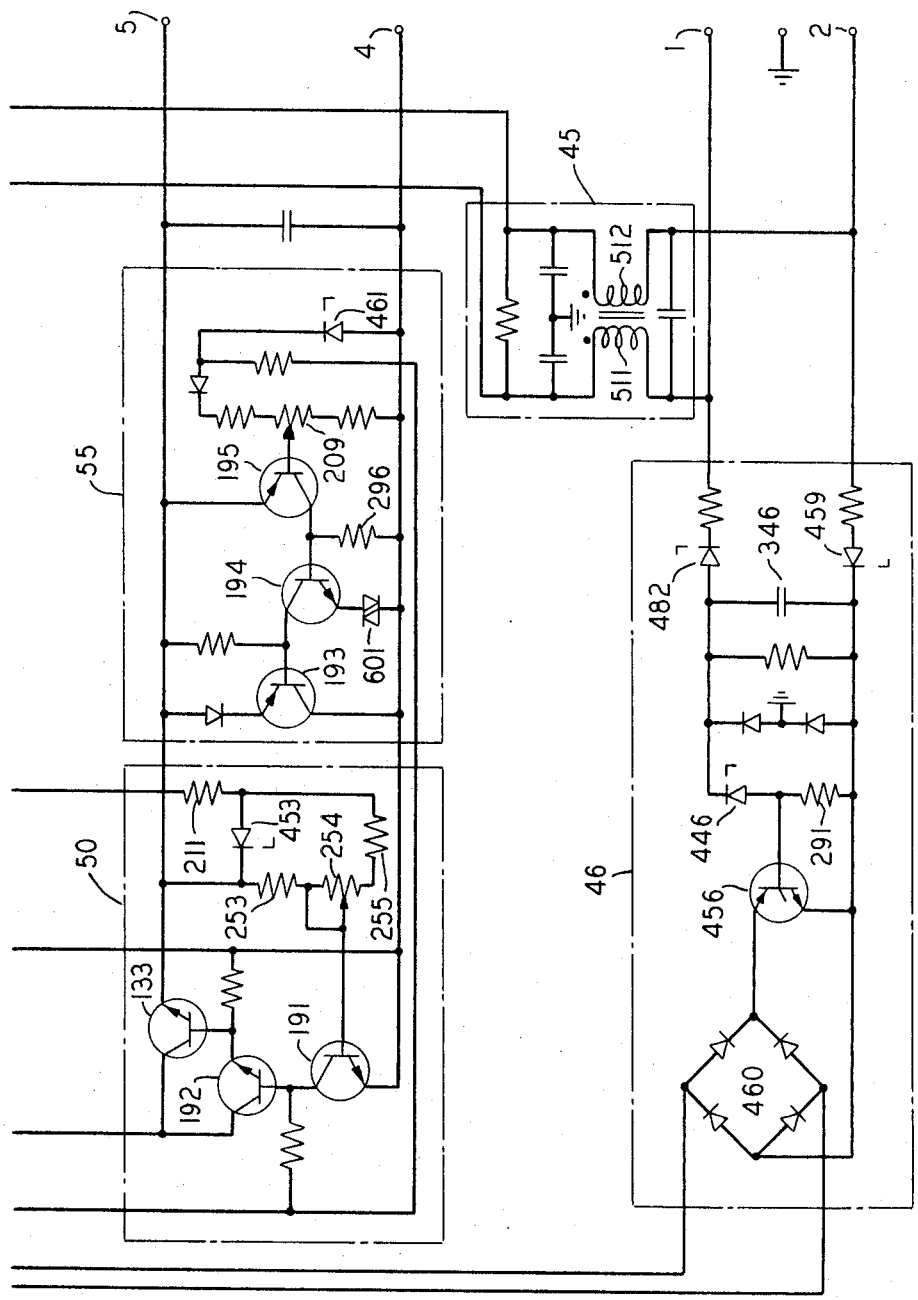

FIGS. 2 and 3 arranged in accord with the diagram of FIG. 4 disclose in schematic diagram form the constant current power supply disclosed in block diagram form in FIG. 1. The power supply supplies two DC output currents on output terminals 1 and 2 of equal magnitude and opposite polarity.

The nature of the invention may be best understood by describing the operation of the illustrative embodiment shown in FIGS. 2 and 3. A source of DC energy 3 energizes a self-excited half-bridge inverter circuit 10, via switch 81. The half-bridge inverter circuit 10 comprises two transistors 111 and 112, and two capacitors 351 and 352, connected opposite each other in a bridge arrangement. The transistors 111 and 112 alternately switch into a conducting state and apply the voltage at the common junction of capacitors 351 and 352, respectively, across the primary winding T1–T2 of the output transformer 25 through the gate winding R1–R2 of the saturable reactor 15. The AC current on the secondary winding T3–T5 is coupled through the current monitor circuitry described below to the filter 45 and then to the output terminals 1 and 2. The voltage of the capacitors 351 and 352 is also applied to primary winding P1–P2 of transformer 52, via lead 11. The switching of the transistors 111 and 112 is controlled by the feedback base drive current which is supplied, via winding P3–P4 of the transformer 52, to winding S9–S10 of transformer 51. This feedback signal is applied to the base electrode of transistors 111 and 112, via windings S11–S12 and S13–S14, respectively.

A series turned circuit comprising the inductor 502, and the capacitor 304, connects the windings P3–P4 to the winding S9–S10 and S13–S14 of the transformer 51. The series resonant frequency of the turned circuit controls the frequency of operation of the half-bridge inverter 10 and supplies periodic signals to windings S11–S12 and S13–S14 to keep the half-bridge inverter switching. The output voltage of the inverter 10 at leads 11 and 12 is a square wave voltage having a peak-to-peak value equal to the input voltage supplied by the input source 3.

Switching action in the inverter 10 is initiated by applying a single current surge to the primary winding S9–S10 of the transformer 51 by a starting circuit when the input power from source 3 is coupled to the inverter by closing the switch 81. The starting circuit comprises a parallel combination of a silicon controlled rectifier (SCR) 404, an avalanche diode 490 and a diode 403 coupled in series with a resistor 203, and a capacitor 303 to the winding S9–S10 of the transformer 51. This starting circuit is coupled across the voltage source 3 upon the closing of the switch 81. The application of the source voltage to the starting circuit causes the SCR 404 to break down and conduct current when avalanche diode 490 conducts. The capacitor 303 is charged to the source voltage through the windings S9–S10 of the transformer 51. The current surge through the winding S9–S10 of transformer 51 as capacitor 303 charges to the source voltage produces a current surge in the secondary winding S13–S14 of the transformer 51 and in the base electrode of transistor 112. The base current surge biases the transistor 112 into its conducting state and thereby starts the switching action in the inverter. The diode 403, shunting the SCR 404, discharges the capacitor 303 when the input voltage source 3 is disconnected from the inverter.

The primary winding T1–T2 of the transformer 25 is connected in series with the gate winding R1–R2 of the saturable reactor 15 and the output of the half-bridge inverter 10. The magnitude of the AC current flowing through the gate winding R1–R2 of the saturable reactor 15 is proportional to the DC current level in its control winding R3–R4. The current level in the control winding R3–R4 is controlled by the feedback control 17 which in turn is responsive to the sum of and the difference between the magnitudes of the two output currents as is described hereinbelow.

As indicated in FIG. 2, the control winding R3–R4 of the saturable reactor 15 is sectionalized to include a constraining choke so as to distribute its inductance along the winding R3–R4. This sectionalized configuration reduces the effective distributed capacitance of both the constraining choke and the saturable reactor control winding R3–R4 and results in a nearly ideal AC current waveform in the gate winding R1–R2 of the saturable reactor 15.

The gate winding current of the saturable reactor 15 is applied, via leads 11 and 12, to the primary winding T1–T2 of the output transformer 25. The two balanced output currents are derived from the transformer leads 13 and 14 connected to the secondary winding T3–T5 of the transformer 25. These two balanced output currents are transmitted through a current monitor circuit 30 which measures the sum of the difference between the magnitudes of the two currents.

The current monitor circuit 30 comprises magnetically coupled current sensing windings which generate magnetic fields responsive to the sum and the difference of the two output currents. The currents generated in the detector windings due to the magnetic fields are combined and utilized as a control signal which is applied to the feedback control 17 as described hereinbelow.

The current-sensing windings T9–T10 and T11–T12 are wound on a common core 26. Windings T9–T10 and T11–T12 are oriented so that the flux generated in core 26 due to the current magnitude in each of the windings is additive. The current resulting from the flux in the detector winding T13—T15 is proportional to the total magnitude of the currents in leads 13 and 15. This AC control current in the detector winding is coupled, via the rectifying-gating diodes 413 and 415, to the feedback control 17.

The current-sensing windings T16–T17, T17–T18, T19–T20, and T20–T21 are wound on a common core 27. The windings are connected with each other in a bridge-type configuration. The series connected windings T16–T17 and T17–T18 are connected in parallel with the series connected windings T19–T20 and T20–T21. The bridge-type circuit connection includes the diode rectifiers 416, 418, 419, and 421 which are individually connected in series with the windings. Due to the rectifying action of diodes 416 and 418 the windings T16–T17 and T17–T18 conduct alternate polarities of the AC output current in lead 13. The windings T19–T20 and T20–T21 conduct alternate polarities of the AC output current in lead 14 due to the rectifying action of diodes 419 and 421. The windings are oriented on the core 27 so that flux established in the core 27 due to current in the windings T16-T17 and T17-T18 opposes the flux in the core 27 due to current in the windings T19-T20 and T20-T21. The resulting AC control current on the detector winding T22-T23 due to the flux variation in core 27 is proportional to the difference between the currents in leads 13 and 14. The AC control current is coupled, via the rectifying-gating diodes 422 and 423, to the feedback control 17.

As is apparent from the foregoing description the current monitor circuit 30 comprises a plurality of current sensing windings wound on the magnetic cores 26 and 27 to monitor the sum of and the difference between the magnitudes of the two output currents. The sensing windings on the magnetic core 26 sense the sum of the two output currents and isolate the feedback control 17 from the output. The sensing windings on the magnetic core 27 sense the difference in the magnitudes of the two output currents and also isolate the feedback control 17 from the output.

The feedback current proportional to the total magnitude of the two output currents is rectified by diodes 413 and 415 and applied, via lead 18, to the feedback control 17. The feedback current proportional to the magnitude balance of the two output currents is rectified by diodes 422 and 423 and also applied, via lead 18, to the feedback control 17. The feedback control utilizes these superimposed currents to control the saturable reactor 15.

The winding T6-T8 of the output transformer 25 is connected to a current droop circuit 35 which, in turn, is coupled, via diode 409 and lead 18, to the feedback control 17. The current droop circuit senses the output voltage of the power supply by monitoring the voltage across the tertiary winding T6-T8 of the output transformer 25. The voltage across the winding T6-T8 is proportional to the power supply output voltage.

The AC voltage of the winding T6-T8 is rectified by the diodes 411 and 412 and applied, via a filter circuit including the capacitor 310, to a reference amplifier circuit. The reference amplifier circuit comprises the transistor 103 and the avalanche diode 421. The avalanche diode 421 is biased by resistor 256 from the internal power supply. The rectified voltage of winding T6-T8 is compared to this reference voltage and the resultant thereof biases transistor 103. The common node of the resistors 112 and 116 is coupled to the base electrode of transistor 103. When the voltage across the winding T6-T8 exceeds a certain threshold value, the voltage at the common node is sufficient to bias the transistor 103 into a conducting condition. The collector-emitter path of transistor 103 conducts a DC current via the diode 409 and lead 18, to the feedback control 17. It is apparent from the foregoing that when the output voltage of the power supply exceeds a certain predetermined threshold voltage, the current droop circuit applies a correction signal to the feedback control 17 to reduce the output current as required to maintain the output voltage below a predetermined maximum value.

The various feedback control currents described above are all gated and rectified in the diodes 409, 413, 415, 422, and 423. A voltage signal proportional to these feedback currents is developed at the wiper arm of the potentiometer resistor 210. This voltage is applied to the base of transistor 102 included in the feedback control 17. This voltage determines the conductivity of transistor 102. A diode 433 shunts the base-emitter junction of transistor 102 to protect it against excessive reverse voltages.

A filter circuit 45 is included to suppress ripple and longitudinal spikes and in the output currents on leads 1 and 2. The inductors 511 and 512 are mutually coupled so that the longitudinal currents in output leads 1 and 2 cancel each other.

An overvoltage converter shutdown control 46 protects the converter from the effects of excessive voltage outputs at the output terminals 1 and 2. If either of the balanced output voltages at output terminals 1 and 2 exceeds a certain threshold voltage, avalanche breakdown occurs in the corresponding avalanche diode 482 or 459. This initiates a charge buildup on capacitor 346 which in turn accumulates a voltage sufficient to break down the avalanche diode 446. Upon the current breakdown of diode 446, the current flow is resistor 291 generates a voltage sufficient in magnitude to bias the silicon controlled rectifier 456 into conduction. The switching of the silicon controlled rectifier 456 into conduction short circuits, via rectifier 460, winding S15-S16 of transformer 51. This diverts the transformed S9-S10 winding currents from the S11-S12, S13-S14 Windings to S15-S16 winding of transformer 51. The loss of current in windings S11-S12, S13-S14 of transformer 51 halts the switching action of the inverter 10. Switching action in the inverter 10 stops and can only be restored by interruption of the source 3 voltage or by operation of switch 81.

An auxiliary regulated DC voltage is derived from the winding P6-P8 of the transformer 52. The DC voltage level on the output terminals 4 and 5 is controlled by the impedance of the series-regulating transistor 133. By varying the impedance in response to variations in the output voltage, a substantially constant output voltage is maintained at the output terminals 4 and 5.

A resistor 211 connected to the voltage supply of the winding at P5 transmits a current to the avalanche reference diode 453. The avalanche diode is connected in parallel with a series voltage divider comprising resistor 255, potentiometer 254 and resistor 253. The difference of the output voltage and the voltage setting on the potentiometer 254 determines the base current of transistor 191. This base current is amplified by transistor 191 and applied to the Darlington connected transistors 192 and 133. This controls the transconductive impedance of transistor 133 in order to maintain the fixed output voltage level.

A shunt limiter arrangement compares the voltage output across terminals 4 and 5 with a reference voltage which is derived from the voltage drop across a reference avalanche diode 461. A portion of this voltage drop is applied, via the potentiometer 209, to bias the transistor 195. The conductivity of transistor 195 is responsive to the difference between the reference voltage established by the avalanche diode 461 and the output voltage at terminal 5. If the output voltage at terminal 5 increases in magnitude, the conductivity of transistor 195 also increases, hence conducting more current. This increase current flowing through resistor 296 overcomes the combined voltage of the base-emitter junction of transistor 194 and varistor 60 and biases transistor 194 into conduction. This in turn biases transistor 193 into conduction. The current flow in conducting transistor 193 diverts sufficient current from the output terminal 5 to keep the output voltage from exceeding a predetermined upper limit value.

What is claimed is:

1. A balanced regulated current supply to supply two balanced currents of opposite polarity comprising a source of oscillatory signals, a saturable reactor to control the amplitude of said oscillatory signals, a transformer having a primary winding connected to said source and said saturable reactor and having a secondary winding including first and second terminals to supply said two currents of opposite polarity respectively, a first inductive winding connected to said first terminal, a second inductive winding connected to said second terminal, a first linear magnetic core, said first and second windings being wound on said first magnetic core and magnetically coupled to produce a magnetic field in said first magnetic core proportional to the sum of the currents in said first and second winding, a second linear magnetic core, third, fourth, fifth and sixth inductive windings wound on said second magnetic core and connected in a closed series loop to form a bridge configuration, a first circuit node in said bridge connecting said first, third and sixth windings, a second circuit node in said bridge connecting said second, fourth and fifth windings, said third, fourth, fifth and sixth inductive windings being magnetically coupled so that the magnetic field produced by a current in said third and fourth windings oppose the magnetic field produced by a current in said fifth and sixth windings, a third circuit node in said bridge connecting said third and fourth windings, a fourth circuit node in said bridge connecting said fifth and sixth windings, output terminals connected to said third and fourth circuit nodes, and means to control the direction of current flow in said third, fourth, fifth and sixth windings so as to rectify the output current in said output terminals, and means to utilize the resultant magnetic field in said first and second magnetic cores to control said saturable reactor.

2. A current supply as defined in claim 8 wherein said means to control the direction of current flow comprises a diode connected to each of the third, fourth, fifth and sixth windings and said means to utilize comprises a seventh winding wound on said first magnetic core so as to be magnetically coupled to said first and second windings and an eighth winding wound on said second magnetic core as to be magnetically coupled to said third, fourth, fifth, and sixth windings, and means to combine the signals induced in said seventh and eighth winding to control said saturable reactor.

3. A current supply as defined in claim 2 including means to derive a regulated voltage from said source of oscillatory signals and auxiliary shunt limiting means to limit the voltage output of said means to derive a regulated voltage including means to derive a reference voltage, means to compare the regulated output voltage with the reference voltage comprising a varistor and transistor responsive to the conductive state of the varistor shunting the output of said means to derive a regulated voltage.

4. A current supply as defined in claim 2 further including an overvoltage protection circuit comprising a PNPN diode responsive to an overvoltage condition in either of said first and second output terminals and means responsive to the breakdown of said PNPN diode to halt the operation of said source of oscillatory signals.

5. A balanced current regulator to supply balanced regulated currents of opposite polarities, comprising a source of alternating current, an output circuit, and a saturable reactor to control the magnitude of said alternating current, an transformer to couple the source and the saturable reactor to the output circuit, said transformer including a secondary winding with first and second terminals to derive a positive and a negative current respectively to supply to said output circuit, a first output current detector to detect the combined magnitude of said positive and negative currents, the first output current detector comprising a first linear magnetic core, a first winding connected to said first terminal, a second winding connected to said second terminal, said first and second windings wound on said first magnetic core and oriented so that the flux produced by said positive and negative currents is additive, a second output current detector to detect the difference in magnitude between said positive and negative currents, the second output current detector comprising a second linear magnetic core, a bridge network comprising third, fourth, fifth and sixth windings all wound on said second magnetic core, the third and sixth windings coupled to said first terminal and the fourth and fifth windings coupled to said second terminal, said third and fourth windings oriented to produce a flux in said second magnetic core in one direction, said fifth and sixth windings oriented to produce a flux in said second magnetic core in a direction opposite to said one direction, output circuit means coupled to said bridge, and means to derive a control signal comprising a first control winding wound on said first magnetic core and a second control winding wound on said second magnetic core, and feedback means responsive to said first and second control windings to generate a control signal to control said saturable reactor.

6. A balanced current regulator as defined in claim 5 wherein said bridge network includes unidirectional current flow means in each arm of the bridge to rectify the currents in the bridge network and said feedback means include means to rectify said control signals and amplifying means coupling said control signal to said saturable reactor.

* * * * *